Figure 4:
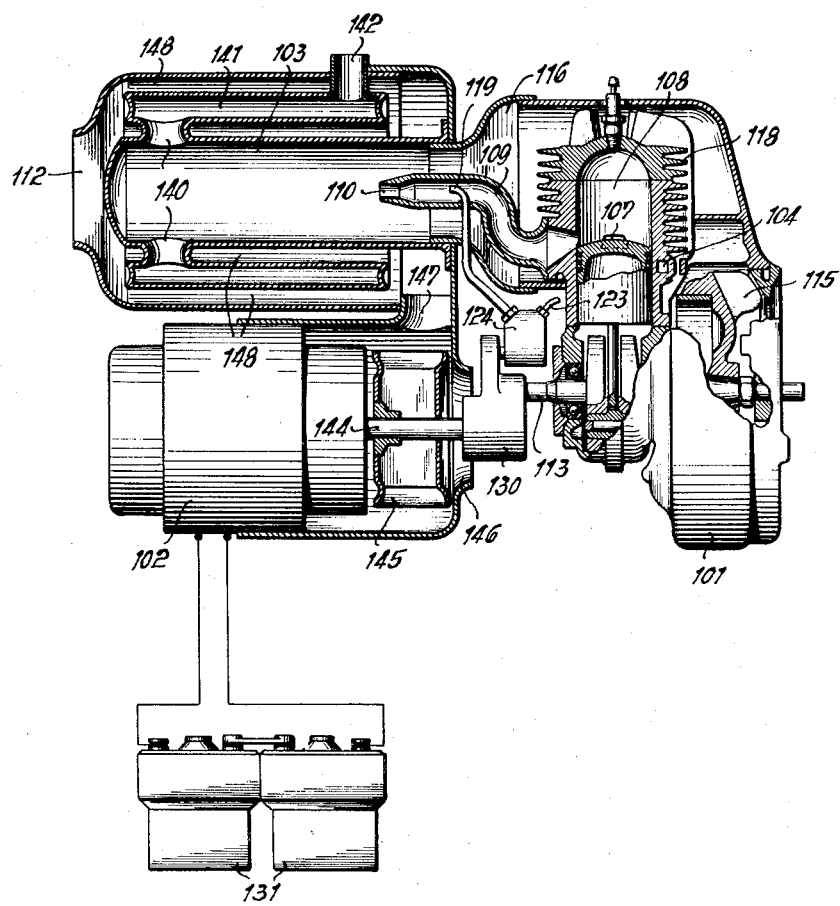

Dec. 16, 1958     R. VON LINDE ET AL     2,864,960
COMBINED SET FOR PRODUCING HEAT AND ELECTRIC ENERGY
Filed Jan. 13, 1956     2 Sheets-Sheet 1
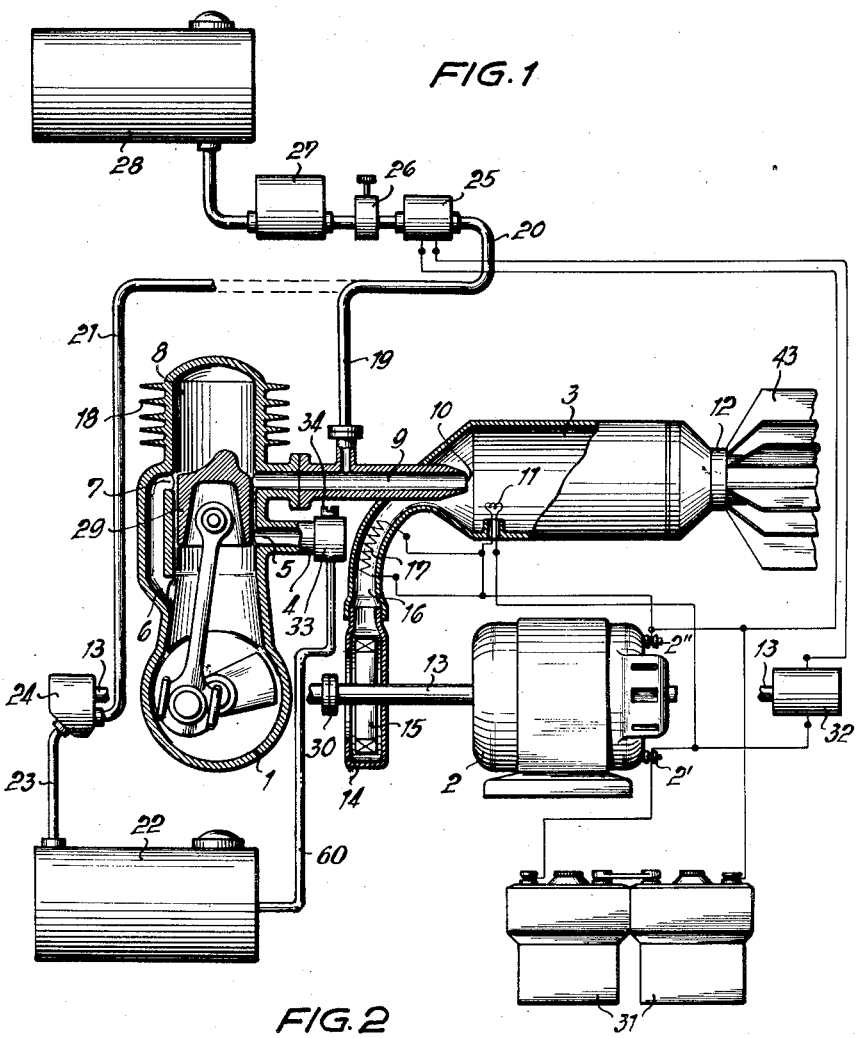
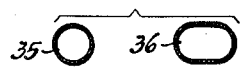
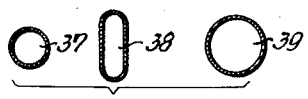
INVENTORS:
Robert von Linde
and Reiner Friedl
By
Patent Agent INVENTORS:
Robert von Linde
and Reiner Friedl By
Patent Agent

United States Patent Office 2,864,960
Patented Dec. 16, 1958

2,864,960

COMBINED SET FOR PRODUCING HEAT AND ELECTRIC ENERGY

Robert von Linde, Grafelfing, near Munich, and Reiner Friedl, Starnberg, Upper Bavaria, Germany, assignors to Wilhelm Baier KG., Webasto-Werk, Stockdorf, near Munich, Germany Application January 16, 1956, Serial No. 559,319

Claims priority, application Germany January 18, 1955

14 Claims. (Cl. 290—2)

This invention relates to a various purpose set comprising an internal combustion engine and an electric generator and intended to produce heat and electric energy.

It is an object of the invention to provide a universal unit adapted to be used more particularly as a preheating and charging set for two- or four-cycle engines and their storage batteries and as a lighting set combined with a source of heat.

A special object of the invention is to provide a universal various purpose set adapted to be used as a heating and air conditioning set, and as a charging and lighting set and to be applied wherever an easily transportable combined unit occupying small space is required, which is independent from a current supply and easy and cheap to operate.

The unit according to the invention comprises a burner which is connected to the exhaust pipe of an internal combustion engine and fed with liquid fuel, and a generator.

A particularly simple embodiment of the unit according to the invention is characterized by the feature that the feed of fuel to and its discharge from the internal combustion engine is adjusted and/or controlled in such a way that a part of the fuel supplied to it is again discharged with the exhaust gas, the exhaust gases being used as a source of heat for the burner. The adjustment and/or control is effected in such a way that the internal combustion engine is adjusted so as to supply more fuel to the motor than the latter is able to burn, for instance, by using a carburetor nozzle of a correspondingly larger size. The mixture fed into the cylinder thus is so rich that it does not correspond to the volume of the cylinder, i. e. it cannot burn completely during the short duration in the cylinder, even if the adjustment of the fuel and air mixture corresponds to the stoichiometric ratio.

Instead of using a nozzle of a corresponding bore in the carburetor, it is also possible, in engines with surface carburetor, to achieve the excessive enrichment or "overfattening" of the fuel mixture by a correspondingly larger extension of the fuel surface from which the passing air entrains or evaporates the fuel. However, the latter arrangement in general will come into question only for stationary plants. Even injection engines can be operated according to the principle of the invention by adjusting the injection pumps to a larger injected quantity. This possibility is particularly important where Diesel engines are used as an internal combustion engine of the unit.

Apart from the adjustment of the fuel supply for superfattening the fuel or air mixture, it is also possible to control the supply of the mixture in such a way that a superfattening occurs. This control is effected, for instance, by changing the control cross section and/or the control period. A change of the control cross section is possible, for instance, by enlarging the cross section of the fuel feeding pipe between the carburetor and the engine, i. e. substantially by providing a larger width thereof. In two stroke engines, a change of the control period can be effected, with unchanged cross sectional surface of the fuel feed pipe, for instance, by reducing the width of the control openings in the circumferential direction of the piston and increasing instead their height in an axial direction of the piston. In case of a uniform enlargement of the cross section of the pipe in all directions, both the control cross section and the control period will be changed.

According to the invention, moreover, fuel may be fed into the burner additionally to the exhaust gases leaving the internal combustion engine and preferably being superfattened. It is very difficult to superfatten the mixture of the internal combustion engine to such an extent that the high heating outputs oftentimes aimed at can be attained by after-burning of the exhaust gases alone. In such cases, an increase of the output of the burner is rendered possible by feeding additional fuel into the burner. Moreover, the heating output of the unit can be made adjustable without having to change the speed of the engine and thus also that of the generator, which automatically would lead to a change of the output delivered by the generator or to overloading of the generator. The additional feeding of fuel is effected, for instance, by a pump which is operated by the internal combustion engine. It is also possible, however, to proceed in such a way that a common tank for the supply of fuel to the internal combustion engine and for the feeding of additional fuel to the burner is arranged above the feed pipe leading to the burner, thus feeding the additional fuel through an adjustable drop pipe, under control of a float, if desired.

Advantageously an electromagnetic shut-off valve is arranged in the additional feeding circuit, said valve simultaneously being connected in the generator circuit, so that the additional feeding of fuel into the burner is automatically interrupted in case of a standstill of the generator. Preferably the electromagnetic shut-off valve is connected in, or disconnected from, an electric circuit by a switch operated by means of centrifugal force and controlled by the driving shaft.

The blower serving for conveying the air for combustion and/or the heating air is preferably arranged on the driving shaft of the generator which according to a preferred form of the invention can be uncoupled from the shaft of the internal combustion engine. Thus the unit can also be used as a ventilation device by uncoupling the internal combustion engine and operating the generator as a motor, for driving the blower. The electrical energy consumed in this case is not so important since a ventilation without heating comes into question during the summer months only, i. e. during a time where the batteries are spared by the higher atmospheric temperatures and mostly are also charged more intensively.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 5:
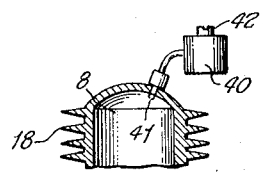

Fig. 1 is a diagram of a unit having the invention applied thereto, comprising an internal combustion engine, an electromotor, and a burner, in section, Fig. 2 is a diagrammatic view showing the alteration of the control cross section by comparing a normal cross section and an altered cross section, Fig. 3 is a similar view but showing the alteration of the control period, Fig. 4 is a diagrammatic view of a modified form of a unit according to the invention, in section, and Fig. 5 shows a fragmentary portion of the engine employed with a fuel injection system.

Similar reference numerals denote similar parts in the different views.

The internal combustion engine 1 is a two-stroke engine coupled to a generator 2, and exhausting into a combustion chamber 3. Through a fuel pipe 4 coming from a carburetor 33 connected to a fuel tank 22 via conduit 60, the engine 1 receives a fuel mixture which is preferably superfattened, its richness being adjustable, e. g. by a screw 34 influencing the mixing ratio of the carburetor 33 in any suitable manner. By way of alternative, in case of an injection engine, the amount of fuel injected by a fuel pump 40 through an injection nozzle 41, can be adjusted by a screw 42 regulating the feed of the fuel pump in per se known manner. The control openings of the internal combustion engine are shown at 5, 6 and 7. The mixture which owing to its superfattening is incompletely burnt, issues from the cylinder 8 as a mixture of exhaust gas and unburnt fuel, through an exhaust pipe 9 and a nozzle 10, into the combustion chamber 3, is ignited by a spark plug 11 which is connected to the terminals 2', 2" of the generator 2, parallel to a battery 31, and burnt. The combustion products issuing at 12 either serve for direct heating or yield their heat contents, through a heat exchanger 43 connected to the combustion chamber 3, to a heating medium, for instance water or air.

The internal combustion engine 1 through a coupling 30 and a shaft 13 drives the generator 2 and an impeller wheel 15 accommodated in the casing 14, for conveying the combustion air required for combustion of the gas mixture coming from the engine. The generator 2 itself serves not only for supplying the current for the spark plug 11 but especially also as a lighting set, charging set for the battery 31 etc. If desired, a heating coil 17 may be inserted in the pipe 16 supplying the air for combustion, said heating coil also being electrically connected to the generator 2, as shown, and serving for preheating the air for combustion. Another possibility of preheating the air for combustion consists in sucking in the air in such a way that it flows past the cooling ribs 118 of the internal combustion engine 1 (Fig. 4).

Where the unit according to the invention is intended for supplying larger heating capacities, according to a further modification of the invention additional fuel is fed into the exhaust pipe 9 issuing into the burner 3, through pipes 19 and 20, or 21.

The fuel supplied through the pipe 21 is conveyed from a tank 22 through a pipe 23 by a pump 24 mounted on the motor shaft 13. Another possibility consists in supplying fuel from a tank 28 arranged above the exhaust pipe 9, through a pipe 20, an electromagnetic shut-off valve 25, a regulator 26 and a float valve 27. The regulator 26 serves for controlling the additional fuel fed to the burner, while the float valve 27 is provided for keeping constant the level of fuel which has been adjusted. The electromagnet shut-off valve 25 is connected in the generator circuit in such a way that it is operated in case of a standstill of the generator 2 and thus of the internal combustion engine 1, so that the burner 3 is also put out of operation. The generator 2 is connected to a battery 31 which is to be charged and in case of a standstill of the unit would keep the electromagnetic shut-off valve 25 in an open position. Therefore, a switch 32 operated by centrifugal force and controlled by the driving shaft 13 is provided, said centrifugal switch interrupting the supply of current to the electromagnetic shut-off valve 25 in case of a standstill of the unit.

The alteration of the control cross section and of the control period will now be briefly discussed in connection with Figs. 2 and 3.

As is well known, a 2-stroke engine is controlled by the actual position of the piston 29, Fig. 1, with respect to the control ports 6 and 7. As the cross sections of the ducts leading to the control ports are altered from the shape 35 in Fig. 2 which is the normal cross section, into the shape 36, the control cross section is enlarged and the engine thus receives more fuel mixture.

Fig. 3 shows the change of the control period by altering the control cross section. Again the cross section is altered from its normal shape 37, into a shape 38 having a larger height of the control cross section, whereby the control period is altered. Where both, the control period and the control cross section are intended to be altered, the cross sectional form 39 shown in Fig. 3 should be adopted.

A modified form of the invention is embodied in Fig. 4 comprising an internal combustion engine 101 and a generator 102. The internal combustion engine 101 is supplied with superfattened fuel mixture through a fuel pipe 104 coming from a carburetor, not shown. Only one of the control ports of an internal combustion engine, i. e. the port 107, is visible. The mixture of exhaust gas, fuel, and air which owing to its overfattened condition is only incompletely burnt, issues from the cylinder 108 through an exhaust pipe 109 and a nozzle 110 into a combustion chamber 103. By an ignition device, not shown, the combustible mixture is ignited and burnt in the combustion chamber 103. The exhaust gases pass through a channel 140 and an annular duct 141 into a discharge pipe 142. The air sucked in through an inlet port 146 is conveyed by a hot air blower 145 driven by the internal combustion engine through a shaft 113, a gear and clutch device 130 and a shaft 144, by means of a duct 147 into an annular duct 148 from which it is fed to the space or object to be heated, through an outlet 112. The air required for the combustion is supplied to the combustion chamber through a blower 115 and a feed pipe 116, past the cooling ribs 118 of the internal combustion engine 101, whereby it is preheated. It will be noted from the embodiment as shown that by uncoupling the internal combustion engine 101 by means of the clutch device 130, the generator 102 can be operated as a motor driving the heating air blower 145 as a ventilation device. In this case, it is powered by the battery 131 which is normally charged by the generator.

The arrangement shown in Fig. 4 is particularly advantageous also in regard to its simplicity, low manufacturing costs and its compact shape requiring little space. Again it is possible to feed additional fuel into the burner nozzle 110, through a fuel pipe 119, in the manner as shown in Fig. 1, e. g., through a fuel pump 124 driven through the gear 130 either from the engine shaft 113 or from the generator-motor shaft 144 and connected to a fuel supply, such as a tank (not shown), by a pipe 123.

It will be understood that the combined set according to the invention is not limited to the use in the fields hereinbefore indicated.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

We claim:

1. A combined set for producing heat and electric energy, comprising an internal combustion engine having an exhaust pipe, an electric generator connected to be driven by the engine, a burner whose feed end is connected to said exhaust pipe, and means for feeding an at least partly liquid fuel to the burner.

2. A combined set for producing heat and electric energy, comprising an internal combustion engine having an exhaust pipe, an electric generator connected to be driven by the engine, a burner whose feed end is connected to said exhaust pipe, and valve means for feeding to the engine such an amount of fuel that a substantial part of the fuel fed to the engine is discharged with the exhaust gas, in an unburnt condition, for after-combustion in the burner.

3. A combined set for producing heat and electric energy, comprising an internal combustion engine having an exhaust pipe, an electric generator connected to be driven by the engine, a burner whose feed end is connected to said exhaust pipe, and means for adjusting the amount of fuel fed to the engine in such a way that a substantial part of the fuel fed to the engine is discharged with the exhaust gas, in an unburnt condition, for after-combustion in the burner.

4. A combined set for producing heat and electric energy, comprising an internal combustion engine having an exhaust pipe including at least one fuel atomizing nozzle, an electric generator connected to be driven by the engine, and a burner whose feed end is connected to said exhaust pipe, the cross section of the nozzle being of such a width that a substantial part of the fuel fed to the engine is discharged with the exhaust gas, for after-combustion in the burner.

5. A combined set for producing heat and electric energy, comprising an internal combustion engine having an exhaust pipe, an electric generator connected to be driven by the engine, a burner whose feed end is connected to said exhaust pipe, and means for injecting into the engine such an amount of fuel that a considerable part of the fuel injected into the engine is discharged with the exhaust gas, in an unburnt condition, for after-combustion in the burner.

6. A combined set for producing heat and electric energy, comprising an internal combustion engine of the two-stroke type having at least one cylinder with an exhaust pipe and with admission ports, an electric generator connected to be driven by the engine, and a burner whose feed end is connected to said exhaust pipe, said admission ports being of such a width that a considerable part of the fuel admitted into said cylinder is discharged with the exhaust gas, in an unburnt condition, for after-combustion in the burner.

7. A combined set for producing heat and electric energy, comprising an internal combustion engine of the two-stroke type having at least one cylinder with an exhaust pipe and with admission ports, an electric generator connected to be driven by the engine, and a burner whose feed end is connected to said exhaust pipe, said admission ports being of such a length that a considerable part of the fuel admitted into the cylinder is discharged with the exhaust gas, in an unburnt condition, for after-combustion in the burner.

8. A combined set for producing heat and electric energy, comprising an internal combustion engine including a cooling blower and an exhaust pipe, an electric generator connected to be driven by the engine, a burner whose feed end is connected to said exhaust pipe, means for conveying combustion air to the burner through the cooling blower, and means for feeding an at least partly liquid fuel to the burner.

9. A combined set for producing heat and electric energy, comprising an internal combustion engine having an exhaust pipe, an electric generator connected to be driven by the engine, a burner whose feed end is connected to said exhaust pipe, means for feeding to the burner an at least partly liquid fuel, means for transferring the burner heat to a heating medium, and means for circulating the heating medium, said circulating means being connected to be driven by said engine.

10. A combined set for producing heat and electric energy, comprising an internal combustion engine having an exhaust pipe, an electric generator connected to be driven by the engine, a burner whose feed end is connected to said exhaust pipe, and means for admixing liquid fuel to the exhaust gas current fed to the burner.

11. A combined set for producing heat and electric energy, comprising an internal combustion engine having an exhaust pipe, means for feeding to the engine an amount of fuel resulting in an exhaust gas containing a considerable amount of unburnt fuel, an electric generator connected to be driven by the engine, a burner whose feed end is connected to said exhaust pipe, and means for admixing liquid fuel to the exhaust gas current fed to the burner.

12. A combined set for producing heat and electric energy, comprising an internal combustion engine having an exhaust pipe, an electric generator connected to be driven by the engine, a burner whose feed end is connected to said exhaust pipe, means for feeding to the burner an at least partly liquid fuel, an engine-driven impeller wheel for feeding air to the burner, and a clutch adapted for selectively coupling the generator with the engine and said impeller wheel.

13. A combined set for producing heat and electric energy, comprising an internal combustion engine having an exhaust pipe, an electric generator connected to be driven by the engine, a burner whose feed end is connected to said exhaust pipe, means for feeding to the burner an at least partly liquid fuel, means for transferring the heat of combustion of the burner to heating air, an impeller wheel driven by said generator for circulating the heating air through the heat transferring means, and a clutch arranged for selectively coupling the generator and the impeller wheel driven thereby with the engine.

14. A combined heating and power plant comprising an internal combustion engine having an exhaust, an electric generator operatively connected to said engine to be driven thereby, a burner having an opening, said exhaust of said engine being connected to said opening of said burner to feed the exhaust gases of said engine to said burner, a liquid fuel tank at a lower level than said exhaust of said engine, a pump means driven by said engine to convey said liquid fuel from said tank to said exhaust to inject it into the exhaust gas current fed to said burner opening, and discharge means in said burner to discharge the burnt gases.

References Cited in the file of this patent

UNITED STATES PATENTS

| | | |
|---|---|---|
| Re. 21,576 | Berryman | Sept. 24, 1940 |
| 1,291,458 | Fessenden | Jan. 14, 1918 |
| 1,820,658 | Hynes | Nov. 3, 1931 |
| 1,824,820 | Hynes | Sept. 29, 1931 |
| 2,025,341 | Curioni | Dec. 24, 1935 |
| 2,076,382 | Minton | Apr. 6, 1937 |
| 2,209,221 | Cain | July 23, 1940 |
| 2,677,932 | Forsling | May 11, 1954 |

FOREIGN PATENTS

| | | |
|---|---|---|
| 108,365 | Sweden | Aug. 31, 1943 |